F. R. Wolfinger.

Extension Table.

No. 3,324. Reissued Mar. 9, 1869.

Witnesses:

Theo Inseke

Wm Trewm

Inventor:

F. R. Wolfinger

Per Munn & Co

Attorneys

N. PETERS, PHOTO-LITHOGRAPHER, WASHINGTON, D. C.

United States Patent Office.

F. R. WOLFINGER, OF CHICAGO, ILLINOIS.

*Letters Patent No.* 70,668, *dated November* 5, 1867; *reissue No.* 3,324, *dated March* 9, 1869.

IMPROVED EXTENSION-TABLE.

The Schedule referred to in these Letters Patent and making part of the same.

*To all whom it may concern:*

Be it known that I, F. R. WOLFINGER, of Chicago, in the county of Cook, and State of Illinois, have invented a new and useful Improvement in Extension-Tables; and I do hereby declare that the following is a full, clear, and exact description thereof, which will enable those skilled in the art to make and use the same, reference being had to the accompanying drawings, and letters marked thereon, making a part of this description, in which—

The present invention has for its object so to improve folding-leaved extension-tables, as to make a more permanent and substantial centre frame, for the support of the centre leg or legs which support the centre of the table when extended, and at the same time giving a greater extension when required, and making it more easy to extend and close up, and permanently fastening one side of the table in its place, while the other side is extended; and It consists in making the end rail in three or four parts, (according to the amount of extension required,) in combination with one or two strips, permanently attached to the central part or parts of the end rails, and also in combination with one or two strips, or bars, permanently attached to the under edge of the central part or parts of the end rails to which the central leg or legs are attached.

A A are the legs of the table, which are attached to the end rails C and side rails B, in the ordinary manner.

The end rails C are made in three or four pieces or divisions, according to the length of extension required. The drawings represent them as being made in four parts, $c^1$ $c^2$ $c^3$ $c^4$, but the parts, $c^2$ $c^3$, may be so made as to form one part where only a limited extension is required.

Figure 1:
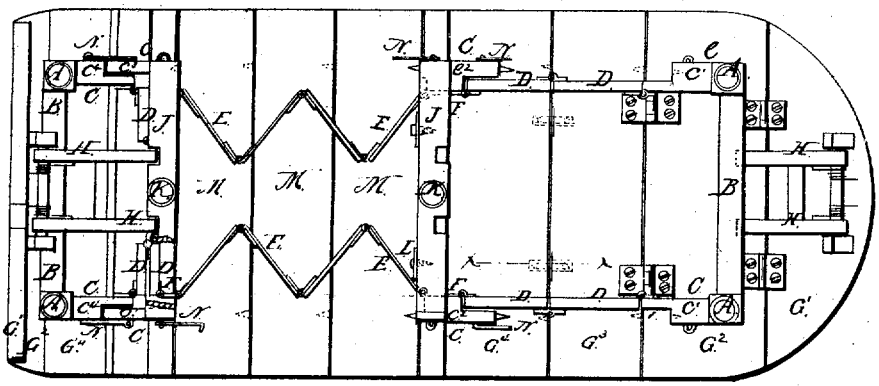
Figure 1 is an under-side view of my improved extension-table partly extended.

D, fig. 1, are the end folds, which are hinged to each other, and to the parts $c^1$ $c^2$ of the end rails; and E E are the central folds, which are also hinged to each other, and to the central parts.

Both folds, D and E, are hinged to the central parts $c^2$ $c^3$ of the end rails C, by double-jointed hinges F, so that they may be folded up closely.

$G^1$ $G^2$ $G^3$ $G^4$ are the leaves of the side extensions, the leaf $G^2$ being connected to the leaf $G^3$ by flexible hinges and dowel-pins, and the leaves $G^3$ $G^2$ $G^1$ being connected to each other by ordinary joint-hinges.

Figure 2:
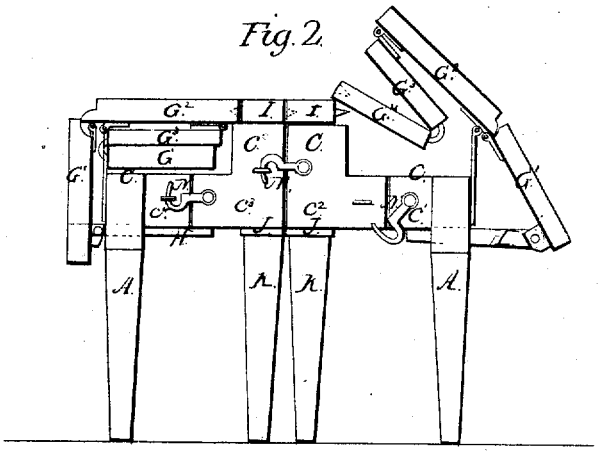
Figure 2 is an end view of the same.
Figure 3:
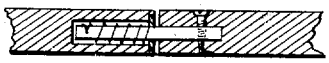
Figure 3 is a detail sectional view, taken through the line *x x*, fig. 1.

The leaf G being connected to the side rail B by hinges, enables the leaves to be folded together, as they are shown at fig. 2, the leaves $G^3$ and $G^4$ folding into recesses formed in the end rails C for this purpose.

The end rails C, when raised up, are held in position by a spring-rack, H, the lower ends of which enter notches formed in the side rails B, and which, when the leaves are lowered, pass under said rails, as shown in fig. 2.

I I represent narrow leaves, which are permanently attached to the central parts or divisions $c^2$ $c^3$ of the end rails C, one leaf, I, however, being all that is required when the end rails C are formed in three parts.

J J are strips, or bars, attached to the under edges of the central parts $c^2$ $c^3$ of the end rails C, and to which the central legs K K are attached, as they are shown in figs. 1 and 2.

L are buttons, which are pivoted to the edges of one of the strips or bars J, and which may be turned up to confine part of the folds E, when their full extension is not required.

M are loose leaves, which rest upon the central folds E, and form the central part of the top when the table is fully extended.

When the table is folded, the parts of the end rails C are secured to each other by hooks and staples N, as shown in fig. 2.

The construction and arrangement herein described and shown for disposing of the auxiliary leaves $G^3$ and $G^4$, are not considered new, they being substantially represented in the patent granted to F. R. Osgood, for extension-table, January 2, 1866, and numbered 51,855. Therefore my invention is made with reference to this fact, and to be used in conjunction with auxiliary leaves folding below the top plane of the table.

Having thus fully described my invention,

What I claim, and desire to secure by Letters Patent of the United States, is—

1. The end rails C, formed in three or four parts, $c^1$ $c^2$ $c^3$ $c^4$, in combination with the central folds E, and side folds D, substantially as herein shown, and for the purpose specified.

2. The combination of the narrow strips or leaves I I with the central parts $c^2$ $c^3$ of the end rails C, substantially as shown and described.

3. The narrow leaves I I, resting upon the parts $c^2$ $c^3$, in combination with the leaves $G^1$ $G^2$ $G^3$ $G^4$, as herein set forth and described.

4. The central strips J, (having the legs K,) in combination with the central parts $c^2$ $c^3$ of the end rail C, end folds D, and central folds E, substantially as described, and for the purposes specified.

5. The arrangement of the leaves $G^1$ $G^2$ $G^3$ $G^4$ and narrow strips I I, whereby the leaves $G^2$ and $G^3$ are folded upon the end rails C, having the leaves G and strip I in the same horizontal plane, to form the top of the table, and the leaf $G^1$ folding down over the ends of the said leaves $G^3$ and $G^4$, substantially as shown and described.

6. The leaf $G^2$ hinged in an elevated position upon the side rail B, and supporting the leaves $G^1$ and $G^3$, the outer end of the leaf $G^1$ adjusted by the spring-catch H, substantially as set forth.

Witnesses: F. R. WOLFINGER.

E. E. GIBSON,

G. L. CHAPIN.